(12) United States Patent
Banh (10) Patent No.: US 11,989,266 B2
(45) Date of Patent: May 21, 2024

(54) METHOD FOR AUTHENTICATING DIGITAL CONTENT ITEMS WITH BLOCKCHAIN AND WRITING DIGITAL CONTENT ITEMS DATA TO BLOCKCHAIN

(71) Applicant: Richard Banh, Port Alberni (CA)

(72) Inventor: Richard Banh, Port Alberni (CA)

( * ) Notice: Subject to any disclaimer, the term of this patent is extended or adjusted under 35 U.S.C. 154(b) by 149 days.

(21) Appl. No.: 17/304,123

(22) Filed: Jun. 15, 2021

(65) Prior Publication Data

US 2022/0398296 A1   Dec. 15, 2022

(51) Int. Cl.
  *G06F 21/10*   (2013.01)
  *G06N 5/04*   (2023.01)
  *H04L 9/06*   (2006.01)
  *H04L 9/00*   (2022.01)

(52) U.S. Cl.
  CPC .............. *G06F 21/10* (2013.01); *G06N 5/04* (2013.01); *H04L 9/0618* (2013.01); *H04L 9/50* (2022.05)

(58) Field of Classification Search
  None
  See application file for complete search history.

(56) References Cited

U.S. PATENT DOCUMENTS

| 10,602,202 | B1* | 3/2020 | Taylor | G06F 21/6245 |
|---|---|---|---|---|
| 11,368,289 | B1* | 6/2022 | Kvochko | G06V 20/46 |
| 11,449,472 | B2* | 9/2022 | Patil | H04L 9/3297 |
| 2017/0206523 | A1* | 7/2017 | Goeringer | G06Q 20/3827 |
| 2020/0034888 | A1* | 1/2020 | Soundararajan | H04L 63/126 |
| 2020/0076798 | A1* | 3/2020 | Lidsky | H04L 63/083 |
| 2020/0219094 | A1* | 7/2020 | Dikhit | H04L 9/3247 |
| 2020/0265147 | A1* | 8/2020 | Li | G06F 21/602 |
| 2020/0351075 | A1* | 11/2020 | Griffin | H04N 21/23109 |
| 2020/0372132 | A1* | 11/2020 | Li | G06F 21/16 |
| 2021/0112306 | A1* | 4/2021 | Ye | H04L 63/123 |
| 2021/0281421 | A1* | 9/2021 | Semenovskiy | H04L 9/3231 |
| 2022/0086004 | A1* | 3/2022 | Chauhan | H04L 9/3226 |
| 2022/0086143 | A1* | 3/2022 | Chauhan | H04L 63/0861 |
| 2022/0342958 | A1* | 10/2022 | Lillard | G06F 16/51 |

FOREIGN PATENT DOCUMENTS

WO   WO-2019236470 A1 * 12/2019 ........... G06F 21/645

* cited by examiner

*Primary Examiner* — Kaveh Abrishamkar (74) *Attorney, Agent, or Firm* — Own Innovation Inc.; James W. Hinton; Kent C. Howe (57) ABSTRACT

Method, systems, and apparatus for receiving one or more digital content items, processing a digital content item into characteristic digital content item data, selecting characteristic digital content item data from received digital content item, writing the selected data to a blockchain network, processing the digital content item into characteristic digital content item data, comparing characteristic digital content item data to blockchain data, analysis of digital content item comparison provided.

20 Claims, 8 Drawing Sheets

METHOD FOR AUTHENTICATING DIGITAL CONTENT ITEMS WITH BLOCKCHAIN AND WRITING DIGITAL CONTENT ITEMS DATA TO BLOCKCHAIN

CROSS-REFERENCE TO RELATED APPLICATION

This application claims the benefit under 35 U.S.C. § 119(e) of U.S. Patent Application No. [62/705,444], entitled "DocuChain" filed [Jun. 27, 2020], which is incorporated herein by reference in its entirety.

TECHNICAL FIELD

This disclosure relates to a system that authenticates and writes digital content items data to blockchain.

SUMMARY

Generally, information is written to a blockchain to signify digital content item ownership. However, the methods limit the amount of information, such as in a combination of a couple of characteristics comprising color, identification code, and object item names. For color, an example would be a digital content item of a red ball: data encoded would be red. Another method is to create a unique identifier and attach it to the digital content item. For an example of a red ball, the object encoded would be a string ball. This preceding method works for the limited scope of copyright ownership. It doesn't expand to guarantee the authenticity of the digital content item in the composition of the digital content item displayed and received. One or more data collection methods, data extrapolation, and selection are broadened, and automated will increase applications of the blockchain. If applied to blockchain methods for consensus of information communicated, it will enable specific guarantees of authenticity within the digital content item. For example, if one partition of the document is altered, it will be identified as changed compared to the consensus data from the blockchain network.

As described in the specification, it is a system that will extract digital content item data using modules comprising methods for pixel value and coordinate extraction and writing to the blockchain. In addition, the user of the system may write digital content item information to blockchain for authentication.

The system receives digital content items and processes them into characteristic digital content item data. It is selecting characteristic digital content item data from the received digital content item. Then the system writes the digital content to a blockchain network. How the system may extract the information from the digital content item is to use an image processing module that extracts pixel values directed by corresponding coordinates from one or more internal and external inputs. Depending on inputs, pixel selection can select component digital content items. It is also essential that an identifier data is generated and matched to the digital content item inputted. The identifier data extended through one or more parts of the system.

When the system authenticates digital content items, corresponding data is requested from the blockchain network, and corresponding pixel values are compared to the blockchain pixel values. Thus, parts of the digital content item will have a related analysis of authenticity.

System authentication and writing digital content item to the blockchain network may receive the digital content item from a remote source. Also, reference data from blockchain may be requested from digital content item identification from one or more sources: user, administrator, artificial intelligence, algorithm, remote. The digital content items may also be a plurality of digital content items.

Advantages may include one or more of the following. The system may determine authenticity from a small amount of data from the digital content item that exists as a fingerprint unique to the digital content item. By application of several data extraction methods not limited to image processing and computer vision. Leveraging a blockchain with broad data collection provides digital content item security for legal material. It also offers advantages for digital IDs issued, notification of altercations by an unauthorized party, speed of issue and conservation of plastics and materials for manufacture.

DETAILED DESCRIPTION

It is also to be understood that the specific modules and systems illustrated in the attached drawings, and described in the following specification, are simply exemplary embodiments of the invention. Therefore, specification and other characteristics related to the embodiments disclosed herein are not to be considered limiting.

An embodiment of the present invention relates to using blockchain and one or more digital content item processing modules containing image processing for digital content item authentication.

Blockchain networks are applied in all methods described below. The systems described below apply one or more blockchain methods: proof of stake, proof of work, smart contracts. The blockchain may exist on networks that exist privately where authorized nodes and digital content item information is inputted to the blockchain depending on where digital content item data should be public.

The smart contract comprises code to store digital content item information, corresponding to digital content item information. Also may apply necessary wallet information for one or more reasons: blockchain gas requirement, excess cryptocurrency held within the smart contract. Depending on the robustness of the blockchain network, blockchain wallet addresses must be created on each occurrence of writing digital content items to the blockchain network for digital content item identification and recouping cryptocurrency. The smart contract information containing digital content information is immutable if desired by one or more system users, system administrators. As described further below, depending on the limitations on the blockchain network, it could be necessary to store data in a specific format, such as a combination of strings to make digital content item data and identification data compact and concise.

Figure 6:
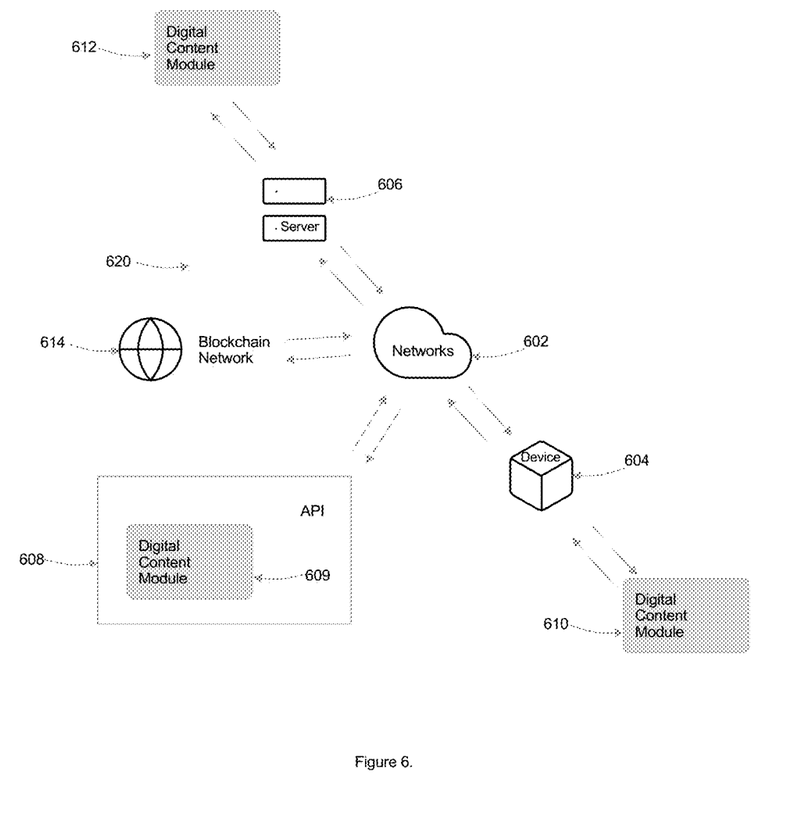
FIG. 6 Schematic illustration expansion comprising of system for digital content item authentication and writing to blockchain.

FIG. 6 is a schematic illustration expansion, example system for digital content item authentication and writing to blockchain [620]. The overall system [620] includes one or more devices [604-606], for example: desktop computer, mobile device, server, connected to a network, e.g., the internet, private local networks, private public network hybrid.

Each device [604-606] may run its own Digital Content Module [609-612]. In addition, each device may route data to one or more devices serving as an API [608] running a Digital Content Module, connected to a network such as: internet, private local networks. The Digital Content Module is discussed further below.

Each device [604-606] and API [608] is connected to a blockchain network sending and receiving digital content item data.

Figure 3:
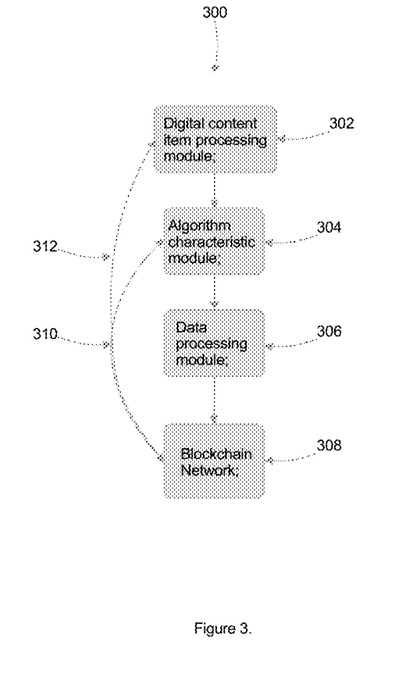
FIG. 3 Schematic illustration of system modules.

FIG. 3 is a schematic illustration of writing digital content item information to the blockchain and an authentication process [300]. Corresponding to Digital Content Module in figures [609-612]. The digital content item processing module [302] makes digital content item data available for the following modules [304-308]. Digital content item processing module internals is discussed further below. Algorithm characteristic module [304], performs value calculations on data received from the digital content item processing module [302]. Algorithm characteristic module internals is discussed further below. The data processing module [306] performs processing on data received from the Algorithm characteristic module [304], providing data compression and data encryption. [308] The blockchain network is sending and receiving digital content item data. [310] Digital content item data transfer connection between the Algorithm Characteristic Module [304] and blockchain network [308] and compared within Algorithm Characteristic Module [304].

Figure 2:
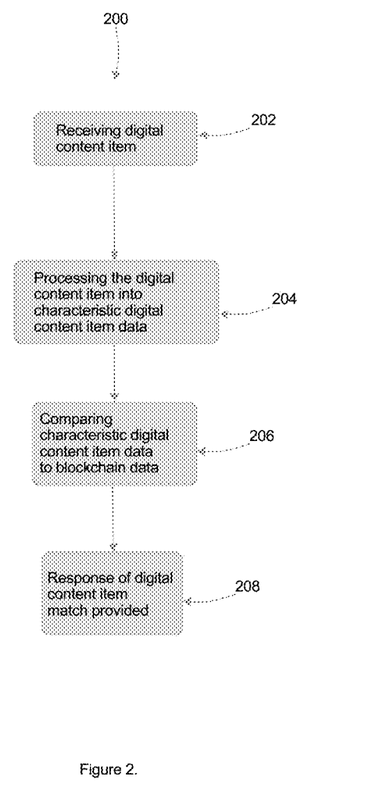
FIG. 2 Process for authentication.

FIG. 2 Example process for authentication [200]. The digital content item is received [202] in formats such as pdf, mp4, jpg, doc. Then, the digital content item is transferred to the Digital content item processing module [302].

The digital content item is transformed into characteristic digital content item data [204] defining data as pixel values, metadata, identification, object nouns, semantic meaning. Then, digital content item data [204] is transferred to the Algorithm Characteristic Module [304].

Identification info is received by the blockchain network [308] from Algorithm Characteristic Module [304], and blockchain data is sent back to Algorithm Characteristic Module [304] in response. The blockchain data is compared to the characteristic digital content item data [206]. Response of digital content item match is provided [208] from the comparison [206].

Figure 1:
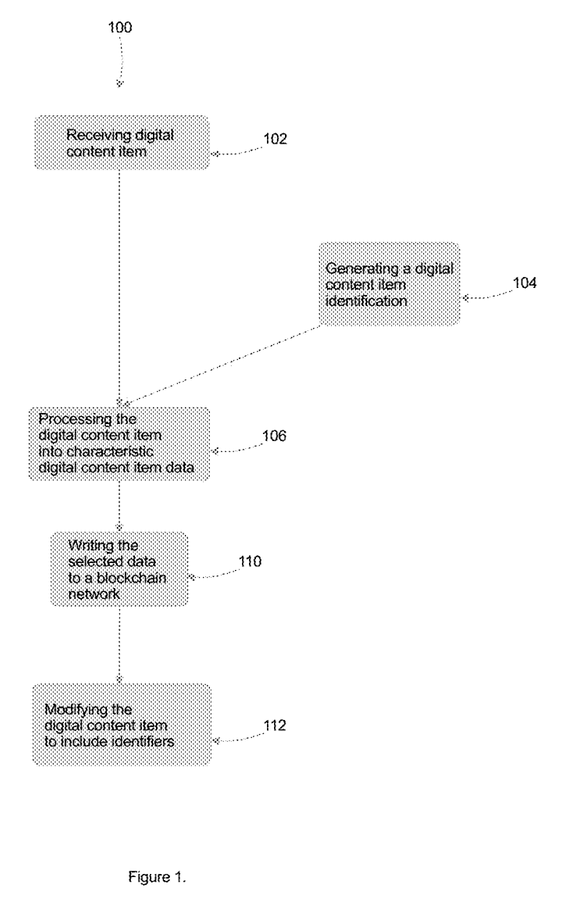
FIG. 1 Process for writing digital content item information to blockchain network.

FIG. 1 Example process for writing digital content item information to blockchain network [100]. The digital content item is received [102] in a format such as pdf, mp4, jpg, doc. Then, the digital content item is transferred to the digital content item processing module [302].

Generating a digital content item identification [104] is transferred to the digital content item processing module [302].

The digital content item is transformed into characteristic digital content item data [106] for example containing pixel values, metadata, identification data, object nouns, semantic meaning. Digital content item data [106] could be reduced in selection before transferring to the data processing module [306].

Data processing module [306] alters data received from [304], has examples of methods for: data compression, data encryption, and data formatting. Then writing the altered data to the blockchain network [308].

Afterwards, modifying the Digital Content Item received with an identifier from [302] process [104]. Specifically the digital content item processing module [302] modifies the Digital Content Item with identifier received from [304].

Figure 4:
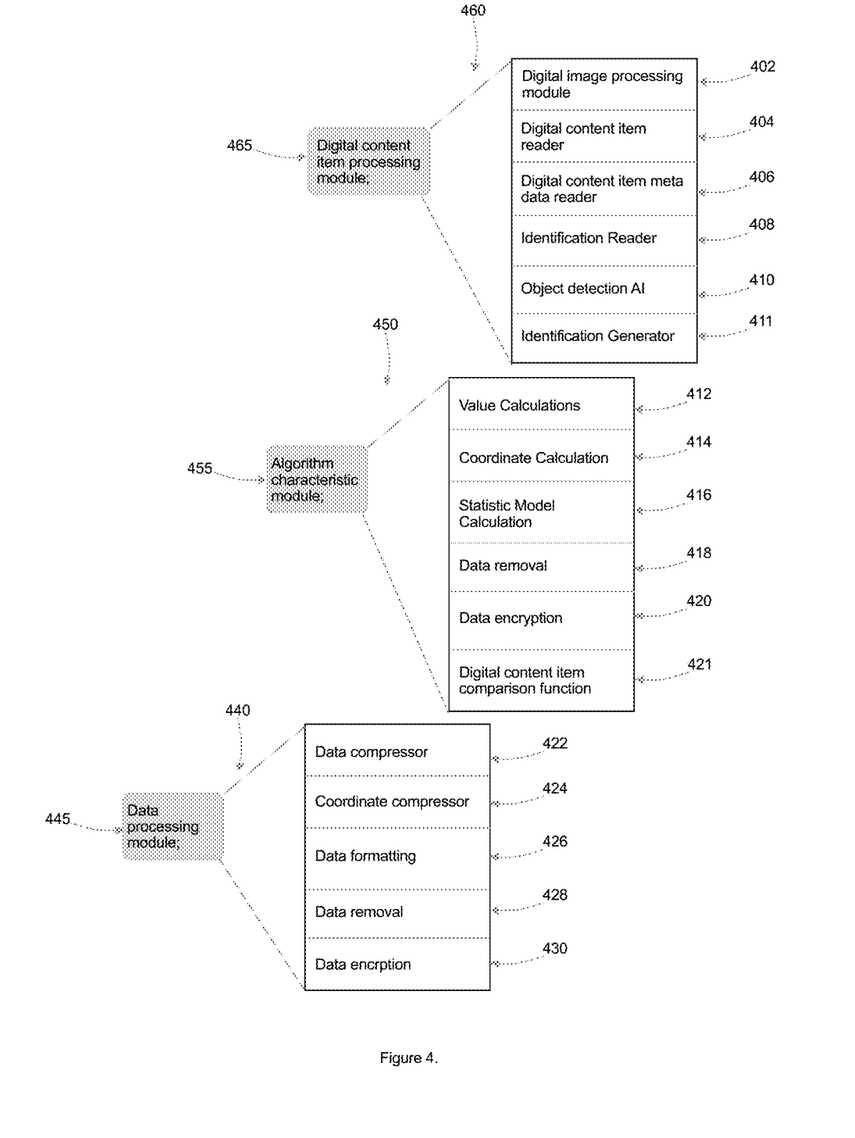
FIG. 4 Digital Content Module comprising one or more functions and modules.

FIG. 4 Example of Digital Content Module has one or more functions and modules.

Increasing efficiency of Digital content item processing module [460], may reduce one or more modules, and functions listed for optimizing speed of methods. Digital content item processing module [465], for example contains Digital image processing module [402], Digital content item reader [404], Digital content item metadata reader [406], Identification Reader [408], Object detection AI [410], Identification Generator [411].

Digital image processing module [402] has methods for example, providing pixel values of the digital content item, providing coordinates decided by external or internal inputs such as Object detection [410] within the system.

Digital content item reader [404], has methods for providing semantic meaning within the digital content item.

Digital content item metadata reader [406] provides digital content item data such as digital content item format, digital content item authored date.

Identification Reader [408] provides data comprising of digital content item identification.

Identification Generator [411], provides new data for a new digital content item comprising of new digital content item identification.

Increasing efficiency of Algorithm characteristic module [450] may reduce one or more modules, and or functions listed. Algorithm characteristic module [455], may comprise of methods for Value Calculations [412], Coordinate Calculation [414], Statistic Model Calculation [416], Data Removal [418], Data Encryption [420], Digital content item comparison [421].

Value Calculations [412] transforms digital content items values, for example, removing values that do not pertain to content within the digital content.

Coordinate Calculation [414] transforms digital content item coordinate values, for example, creating averages between points.

Statistic Model Calculation [416] creates generalities of the data available such as standard deviations, variances, and averages.

Data removal [418] will exclude data that is deemed unnecessary by external inputs. Data encryption [420] will encrypt data deemed necessary by external inputs to be further encrypted.

The digital content item comparison function [421] will compare blockchain data and digital content items characteristic data to provide an analysis.

Increasing efficiency of Data processing module [440] may reduce one or more modules, and or functions listed. Data processing module [445], may comprise of: Data Compressor [422], Coordinate compressor [424], Data formatting [426], Data Removal [428], Data Encryption [430].

Data Compressor [422] compresses digital content item's values, for example, creating a single array from pixel value objects.

Coordinate compressor [424], compresses digital content items coordinate values, for example, creating a single array from coordinate value objects.

Data formatting [426] creates data that is in the format that blockchain will take for upload.

Data removal [428] will filter data that is unnecessary for blockchain.

Data encryption [430] will encrypt data deemed necessary by external inputs to be further encrypted.

Figure 5:
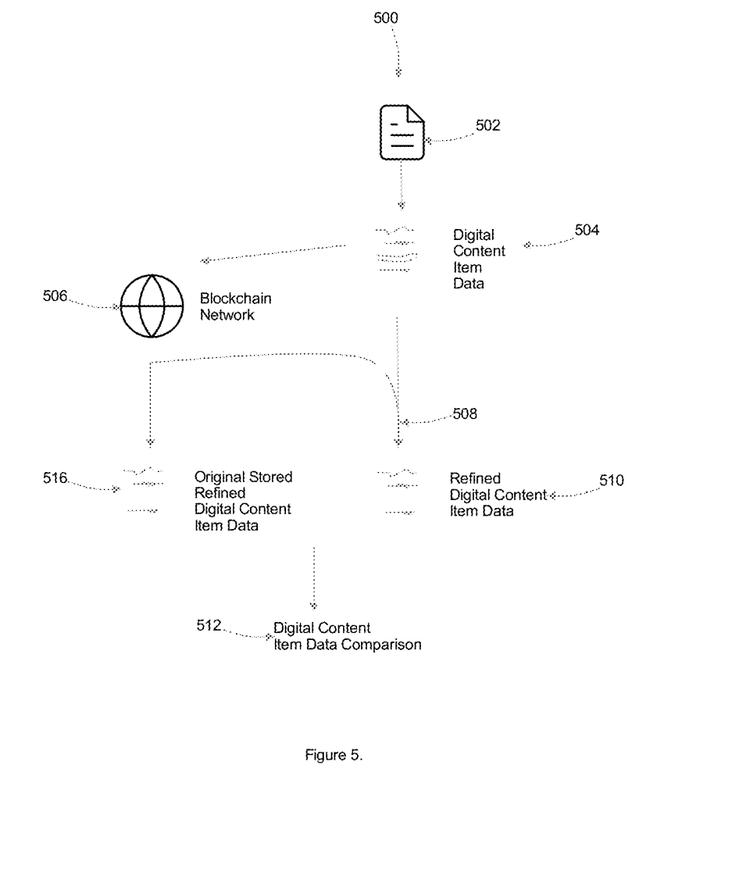
FIG. 5 Process of digital content item comparison.

FIG. 5 Example process of digital content item comparison [500]. The digital content item is received [502], and Digital content item data is extrapolated in the Digital content item processing module [302], using reference blockchain data requested from [506] through [312] data connection to the blockchain network. Reference blockchain data received [508] refines [504] into [510] in Digital content item processing module [302]. [516] Original Stored Refined Digital Content Item Data is the source of truth received from blockchain Network [506]. [516] Original Stored Refined Digital Content Item Data and Refined Digital Content Item Data [510] is compared at [512] Digital Content Item Data Comparison within Algorithm Characteristic Module [455].

Figure 7:
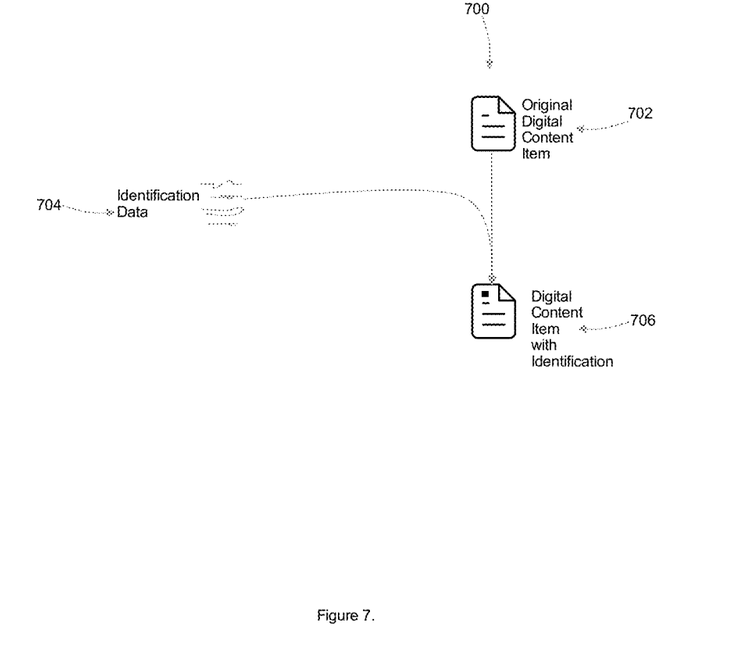
FIG. 7 Process modifying the digital content item to include a digital content item identifier.

FIG. 7 Example process modifying the digital content item to include a digital content item identifier [700]. Digital Content Item received [702]. Next, Digital Content Item Identifier data [704] is formed from one or more methods: external system inputs such as user inputs, or internal system generation such from module [465] using [411]. Finally, Digital Content Item received [702] is combined with the Digital Content Item Identifier data [704] into [706] Digital Content Item with Identification.

Figure 8:
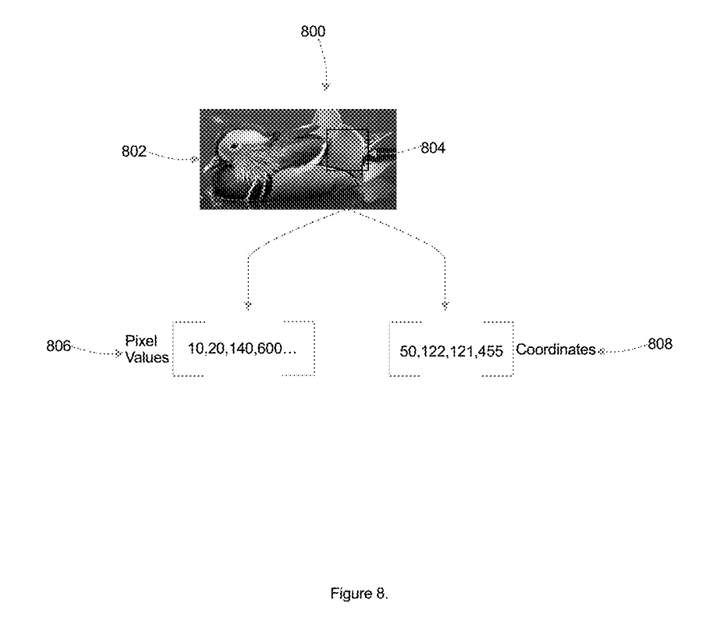
FIG. 8 Process comprising of: extracting pixel values, coordinates.

FIG. 8 Example process of: extracting pixel values, coordinates [800]. Digital Content Item [802], pixel area is selected from inputs comprising of one or more: external inputs, internal inputs. External inputs, for example, are user input. Internal inputs, for example, is a system module for object detection, described further below.

Generating a selection of pixel values and coordinates [804] on Digital ContentItem [802]. [804] is extrapolated into one or more pixel values [806], comprising of: arrays, objects. [804] Selection of pixel values and coordinates is also extrapolated into one or more coordinate values [808], such as arrays, objects, simple strings. Pixel values [806] and Coordinate values [808] is appended to one or more data packages, Digital Content Item Data [504], Processing the digital content item into characteristic digital content item data [106], digital content item data [204].

The object detection module is a pre-trained model recognizing objects such as text, text blocks, images, image objects such as people, data graphs. In addition, the object detection module provides a plurality of information such as coordinates, objects, probabilities of certainty of object recognition. The list provided is an example source of internal inputs for the extraction process [800], determining the selection of pixel values and coordinates [804].

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a non-transitory computer storage medium for execution by, or to control the operation of, data processing apparatus. Alternatively or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. A computer storage medium can be, or be included in, a computer readable storage device, a computer readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer readable storage devices or received from other sources.

The term "Digital Content Module" encompasses all kinds of apparatus, devices, and machines for processing data, including by way of a programmable processor, a computer, a system on a chip, or multiple ones, or combinations. The module can include special purpose logic circuitry, e.g., an FPGA (field programmable gate array) or an ASIC (application specific integrated circuit). The module can also include, in addition to hardware, code that creates an execution environment for the computer program in question, e.g., code that constitutes processor firmware, a protocol stack, a database management system, an operating system, a cross platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks.

Embodiments of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Thus, particular embodiments of the subject matter have been described.

What is claimed is:

1. A method for writing an identification data corresponding to a digital content item to a blockchain, the method comprising:
   receiving, as digital data, a digital content item;
   processing the digital content item to obtain characteristic digital content item data comprising a plurality of characteristic data items, each characteristic data item indicating a characteristic of at least one object of the digital content item;
   selecting from the characteristic digital content item data at least one characteristic data item to obtain an identification data corresponding to the received digital content item, wherein the identification data comprises a subset of the characteristic data items of the characteristic digital content item data that indicates an identity of the digital content item for authenticating if an identity of a to be authenticated digital content item matches the identity of the digital content item based on the characteristic data items and wherein the characteristic data item is selected based on one or more of an external provided input and an internal input generated by a pretrained artificial intelligence model; and
   writing the selected identification data to a blockchain network.

2. The method of claim 1, the blockchain network is applying one or more of methods: proof of stake, proof of work, and smart contract.

3. The method of claim 1, further comprising: extracting pixel values and pixel coordinates from the received digital content item.

4. The method of claim 3, further comprising: selecting characteristic digital content item pixel data and pixel coordinates, and writing to the blockchain network.

5. The method of claim 1, further comprising: receiving digital content item identification using input identification data.

6. The method of claim 1, further comprising: generating a digital content item identification.

7. The method of claim 1, further comprising: modifying the digital content item to include a digital content item identifier.

8. The method of claim 1, wherein writing the selected data to the blockchain network, the selected data storage is stored within smart contracts on the blockchain network.

9. The method of claim 8, the selected data is in a compressed format.

10. The method of claim 8, wherein writing the selected data comprises generating a new blockchain wallet address.

11. A method for determining digital content item data identity match to identification data received from a blockchain network, the method comprising:
    receiving, as digital data, one or more digital content items;

processing each digital content item to obtain characteristic digital content item data comprising a plurality of characteristic data items, each characteristic data item corresponding to a characteristic of at least one object of the received digital content items;

receiving, from a blockchain network, an identification data comprising characteristic data items corresponding to a first digital content item, wherein the identification data indicates an identity of the first digital content item;

comparing characteristic data items corresponding to each digital content item to the characteristic data items of the identification data;

analyzing the digital content item comparison to obtain an authenticity of at least one of the received digital content items, wherein the authenticity indicates that the identity of the corresponding digital content item matches the identity of the first digital content item.

12. The method of claim 11, further comprising, requesting blockchain data using digital content identification.

13. The method of claim 12, further comprising receiving identification from one or more of sources: the digital content item, user, administrator, artificial intelligence, algorithm, and remote source.

14. The method of claim 11, further comprising: extracting pixel values and coordinates from received digital content items.

15. The method of claim 14, further comprising: comparing digital content item pixel values and coordinates to blockchain data.

16. The method of claim 11, wherein detecting a digital content item provided by the user receiving digital content item data from a remote source.

17. The method of claim 11, wherein receiving digital content items is a plurality of digital content items.

18. A computer system for writing an identification data corresponding to a digital content item to a blockchain, the system comprising:
- a digital content item processing module configured to receive, as digital data, a content item and process the digital content item to obtain characteristic digital content item data comprising a plurality of characteristic data items, each characteristic data item indicating a characteristic of at least one object of the digital content item;
- an algorithm characteristic module configured to select from the characteristic digital content item data at least one characteristic data item to obtain an identification data corresponding to the received digital content item, wherein the identification data comprises a subset of the characteristic data items of the characteristic digital content item data that indicates an identity of the digital content item for authenticating if an identity of a to be authenticated digital content item matches the identity of the digital content item based on the characteristic data items and wherein the characteristic data item is selected based on one or more of an external provided input and an internal input generated by a pretrained artificial intelligence model; and
- a data processing module configured to write the selected identification data to a blockchain network.

19. The computer system of claim 18, further comprising an artificial intelligence module configured to provide a digital content item identification.

20. The computer system of claim 18, further comprising an image processing module configured to provide pixel values of the digital content item.

* * * * *